(12) United States Patent
Saccagno

(10) Patent No.: US 7,391,014 B2
(45) Date of Patent: Jun. 24, 2008

(54) VEHICLE OUTSIDE REAR-VIEW MIRROR ASSEMBLY PREPARED FOR CARRYING AN IMAGE DETECTOR DEVICE

(75) Inventor: Andrea Saccagno, Turin (IT)

(73) Assignee: Fico Mirrors, SA, Barcelona (ES)

( * ) Notice: Subject to any disclaimer, the term of this patent is extended or adjusted under 35 U.S.C. 154(b) by 32 days.

(21) Appl. No.: 10/556,759

(22) PCT Filed: May 22, 2003

(86) PCT No.: PCT/ES03/00239

§ 371 (c)(1),
(2), (4) Date: Nov. 15, 2005

(87) PCT Pub. No.: WO2004/103774

PCT Pub. Date: Dec. 2, 2004

(65) Prior Publication Data

US 2007/0023611 A1 Feb. 1, 2007

(51) Int. Cl.
*H01J 5/02* (2006.01)
*H01L 27/00* (2006.01)
(52) U.S. Cl. ..................................... 250/239; 250/208.1
(58) Field of Classification Search ............... 250/208.1, 250/239, 216, 221; 359/229, 602–608, 838, 359/868, 869, 265, 267, 272–275, 268, 871; 348/148; 396/419, 428; 362/494
See application file for complete search history.

(56) References Cited

U.S. PATENT DOCUMENTS

| 6,520,690 | B2 * | 2/2003 | Chu ............................ 396/419 |
| 6,592,229 | B2 * | 7/2003 | Sato et al. .................... 359/608 |
| 6,954,152 | B1 * | 10/2005 | Matthews ..................... 340/937 |
| 6,959,994 | B2 * | 11/2005 | Fujikawa et al. ............. 359/871 |
| 7,050,089 | B2 * | 5/2006 | Nakamura .................... 348/148 |
| 2001/0015862 | A1 | 8/2001 | Lynam et al. |
| 2003/0193613 | A1 * | 10/2003 | Matko et al. ................. 348/375 |

FOREIGN PATENT DOCUMENTS

| DE | 100 43 087 A1 | 3/2002 |
| EP | 0 899 157 B1 | 10/2004 |
| GB | 2 340 097 A | 2/2000 |
| JP | 2001-322492 | 11/2001 |

OTHER PUBLICATIONS

International Search Report for PCT International Application PCT/ES/03/00239 mailed Jul. 21, 2003.

* cited by examiner

*Primary Examiner*—Que T. Le
*Assistant Examiner*—Pascal M Bui Pho
(74) *Attorney, Agent, or Firm*—RatnerPrestia

(57) ABSTRACT

An outside rear-view mirror for a vehicle, which is designed to support an image-detector device is disclosed. The assembly comprises a casing with a reflector fastening device and a detector fastening device configured to mount either a first reflector installed over the detector fastening device, hiding them, or a second reflector, smaller than the first one, leaving the detector fastening device clear and available for the installation of the image detector device in operating conditions.

36 Claims, 6 Drawing Sheets

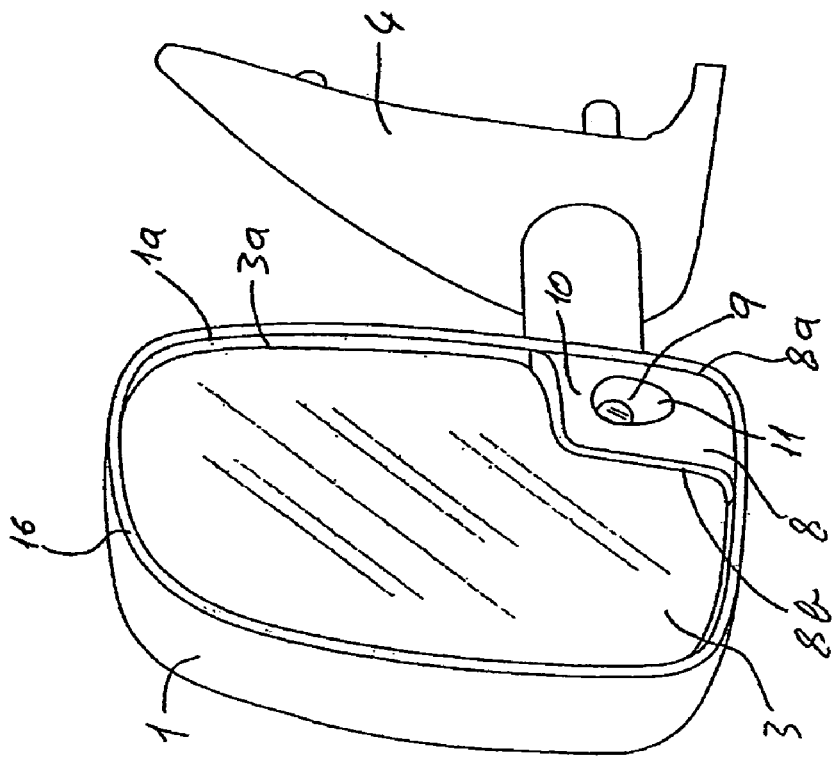
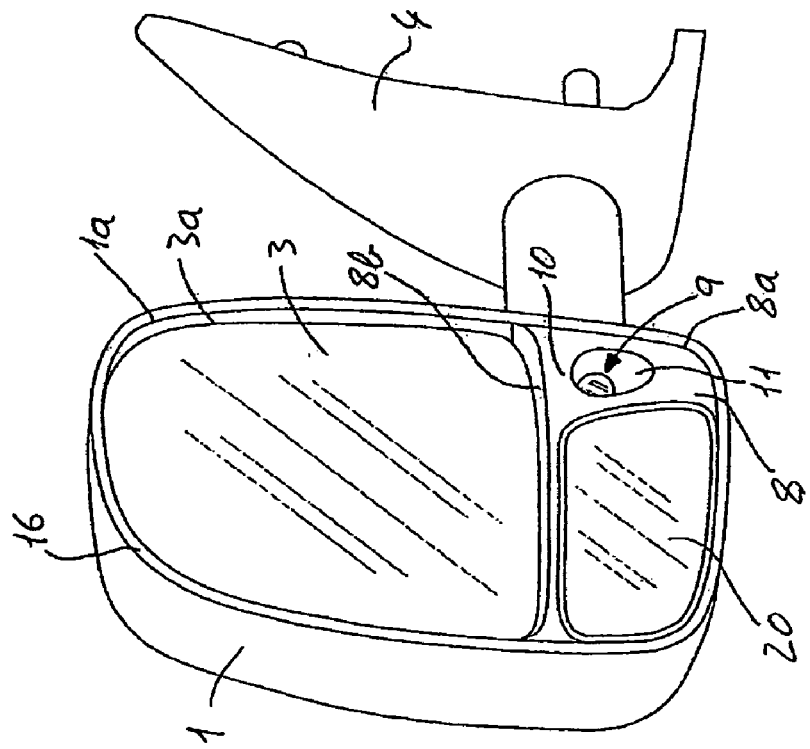

VEHICLE OUTSIDE REAR-VIEW MIRROR ASSEMBLY PREPARED FOR CARRYING AN IMAGE DETECTOR DEVICE

This application is a U.S. National Phase Application of PCT International Application No. PCT/ES2003/000239, filed May 22, 2003.

SCOPE OF INVENTION

The present invention relates in general to a vehicle outside rear-view mirror assembly prepared for carrying an image detector device and, particularly, to an outside rear-view mirror assembly of vehicle provided with a single casing configured in a way that in itself a first single reflector may be installed, occupying substantially all the space available within the casing, or a second smaller reflector together with an image detector device, using an adapter.

TECHNICAL BACKGROUND

According to state of the art, it is known to incorporate an image detector device, as a CCD camera, in an outside rear-view mirror assembly of a vehicle to provide a rear image reflected by the reflector and representative digitalized data of an image captured by the image detector device, said data being susceptible to be used later on by electronic means, in order to provide, for example, warning signals to the driver.

A known method to execute this function consists in designing a casing provided with specific configuration for the installation of a reflector, reserving a part of the space available within the casing for other specific configurations for the installation of the image detector device. A disadvantage of this system, however, is that the mentioned casing comprising specific configurations, may only be used for installing a reflector together with an image detector device. When it is not desired to fit a vehicle with an image detector device, for example for the basic versions of a model, it is necessary to manufacture a casing with specific configurations for the installation of one single deflector occupying all the space available within the casing. Therefore, this makes it necessary to provide two different moulds for the manufacture of one or the other of the casings, with a corresponding rising in costs.

It is also known to design a casing provided with specific configurations for the installation of a reflector and an image detector device, where the reflector is of a transparent type at the non-reflecting side and is located covering the image detector device, so that the image detector device acquires information through the reflector. Even though with this construction it would be possible to use the same casing for the installation of a conventional reflector omitting the image detector device, the acquisition of information with the detector through the transparent reflector may present problems, due to non-desired reflects depending on the light conditions.

The object of the present invention is to solve the previous mentioned drawbacks providing an outside rear-view mirror assembly of vehicle adapted for the optional incorporation of an image detector device, where a single casing is usable for the installation of a reflector substantially occupying the space available within the casing, or a reflector occupying a part of the available space together with an image detector device, associated with an adapter occupying the remaining space within the casing.

DISCLOSURE OF THE INVENTION

According to the present invention the previous object is achieved providing a vehicle outside rear-view mirror assembly comprising, as it is conventional, a casing in which at least one reflector will be installed providing a reflected rear image visible by a vehicle occupant, and a support base to fix the assembly of said casing and reflector to a part of the vehicle. The rear-view mirror assembly of the present invention is characterised in that it comprises reflector fastening means configured in such a way allowing to support in said casing either a first reflector of a first size, or a second reflector of a second size, said second size being smaller than the first size. The assembly also comprises detector fastening means for supporting in said casing an image detector device able to provide a rear image representative signal susceptible to be processed and presented as an information to a vehicle's occupant. The mentioned reflector and detector fastening means are configured and arranged to provide two different installation options. According to the first installation option, said first reflector is mounted in the reflector fastening means so that the first reflector is installed overlapping and hiding the detector fastening means. According to the second option, said second reflector is mounted in the reflector fastening means and the detector fastening means are available for the installation of said image detector device in operating conditions.

With this construction, when it is not desired to equip the vehicle with an image detector device, for example, for the basic version of a model, it is enough to install the first reflector in the reflector fastening means of the casing and, when it is desired to equip the vehicle with an image detector device for higher versions of the same model, it is enough to mount the smaller-sized second reflector in the reflector fastening means and the image detector device in the detector fastening means of the casing.

Thanks to this, the design and manufacture of a single casing including the mentioned reflector and detector fastening means is enough for all the versions of a same model, thereby leading to a corresponding saving in the design, manufacture, storage and mounting costs.

According to an exemplary embodiment, the casing comprises at least one cavity accessible through a wide opening limited by an inner contour, the reflector and detector fastening means being located in a back wall of said cavity. The first reflector comprises an outer contour which conforms with a clearance in said inner contour of said cavity opening, whereas for the installation of the second reflector, the assembly comprises an adapter having an first outer contour portion which conforms to a portion of the inner contour of the casing cavity opening and an second outer contour portion which cooperates with the remaining portion of the cavity inner contour in order to define a new inner contour of smaller size, to which an outer contour of the second reflector conforms with a clearance.

The image detector device is associated with the adapter and this one comprises an orifice through which the image detector device acquires information. For installing the image detector device, it may be mounted within the adapter and then the adapter attached to the detector fastening means, or the image detector device may be fixed to the casing cavity, either in the front or rear portion of it, and the adapter installed in the cavity facing the image detector device. In either case, either the adapter or the detector fastening means of the cavity comprise attaching and centring means which cooperate with complementary means of the image detector device in order to maintain the image detector device in an appropriate position facing said adapter orifice. Optionally, said attaching and centring means include an auxiliary chassis provided with configurations for attaching the image detector device and other configurations adapted for the fixation of the auxiliary chassis to the adapter.

The use of said adapter, apart from eventually providing the previously described attaching and centring means for the image detector device, it provides a high aesthetic level exterior finish. Advantageously, the adapter further comprises a visor configuration adjacent to an upper part of said adapter orifice and a gutter adjacent to a lower portion thereof as protection against environmental agents, such as water drops or incident sunbeams. The mentioned gutter configuration comprises, preferably, a lower inclined portion at an angle of at least 45° to the horizontal and the visor configuration and/or gutter configuration protrude, with respect to the adapter orifice, a distance equal to or greater than the orifice diameter. As an option, the adapter orifice is closed by a transparent element.

On the one hand, the adapter may be dimensioned in such a way that it only occupies a minimum essential space for the installation of the image detector device or may be a sufficient size to further incorporate, for example, an auxiliary reflector. On the other hand, the rear-view mirror assembly of the present invention is compatible with an actuating device, either with a manual drive, or motorized with one or two motors, in order to selectively move the reflector in relation to the casing. Therefore the reflector fastening means are integrated in said actuating device, and the cavity of the casing is dimensioned to accommodate the actuating device behind the corresponding reflector.

BRIEF DESCRIPTION OF THE DRAWINGS

The previous and other features of this invention will be more clearly apparent from the following description of some embodiments illustrated in the accompanying drawings, which have to be taken as illustrative, non limitative examples.

In the accompanying drawings:

FIG. 8 is a view of the assembly once mounted according to another exemplary embodiment;

FIG. 9 is a view of the assembly once mounted according to still another exemplary embodiment.

DETAILED DESCRIPTION OF THE EXEMPLARY EMBODIMENTS

Figure 1:
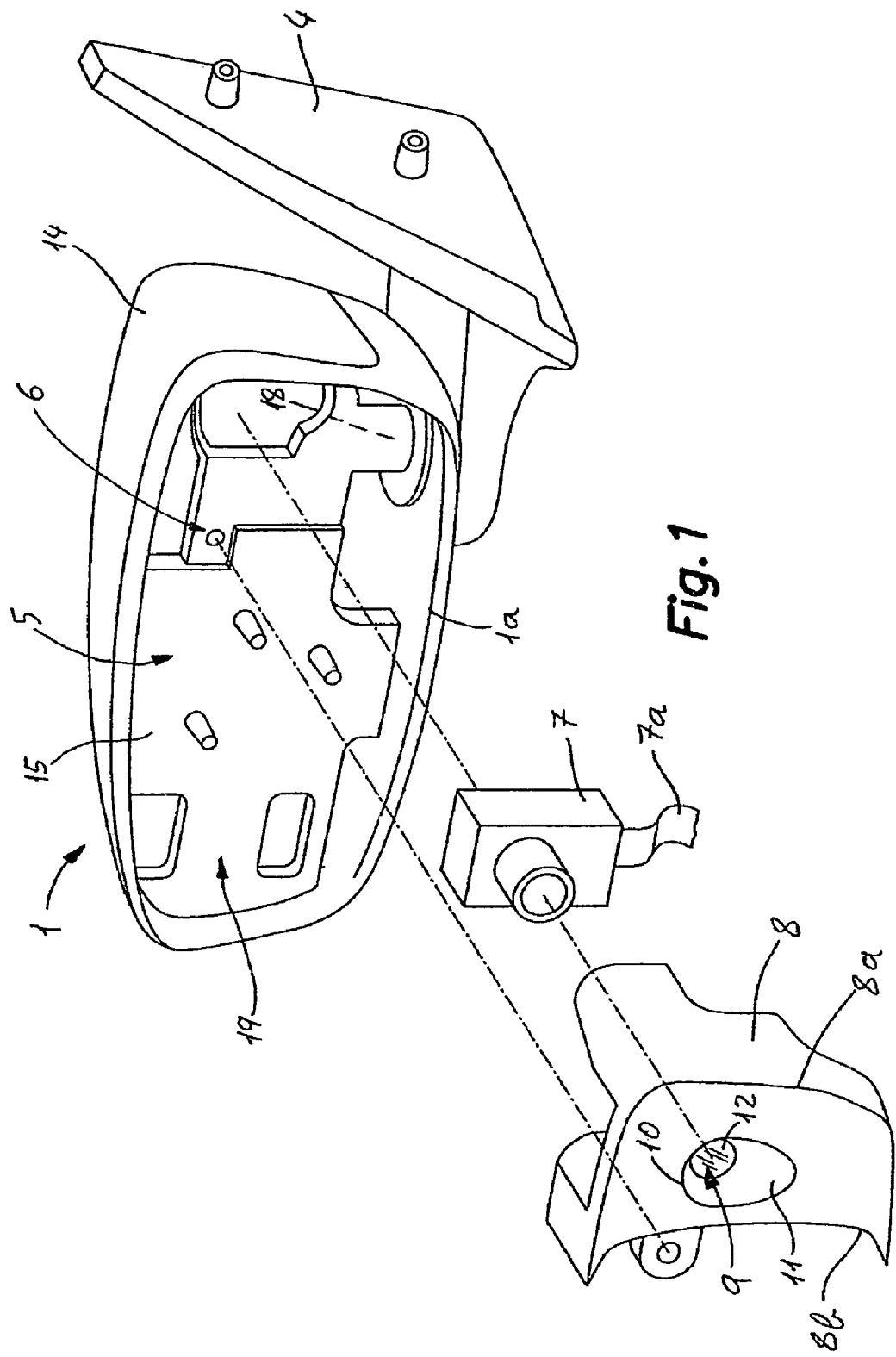
FIG. 1 is an explosive perspective view of a first exemplary embodiment showing in detail all the components comprised by the assembly object of the present invention.

FIG. 1 shows a vehicle outside rear-view mirror assembly prepared to carry an image detector device, comprising a casing 1 having at least one cavity 19 accessible through a wide opening limited by an inner contour 1a, reflector and detector fastening means 5, 6 being located in said at least one cavity 19. Said opening is covered by at least one reflector 2, 3 (see FIGS. 3 and 4), installed in the cover and providing a reflected rear image visible by a vehicle occupant, and a support base 4 to fix the assembly of said casing 1 and reflector element 2, 3 to an exterior part of the vehicle.

Said assembly comprises at least reflector fastening means 5 to support in said casing 1 either a reflector 2 (see FIG. 3) of a first size or a second reflector 3 (see FIG. 4) of a second size, said second size being smaller than the first size, an detector fastening means 6 to support in said casing 1 an image detector device 7 able to provide a signal representative of one or more rear images susceptible to being processed and analysed, and the data obtained from said analysis and processing used to provide an information to a vehicle occupant, such as a driver, in the form of light and/or sound warning signals, locking of the vehicle steering device to avoid a collision, etc.

Figure 2:
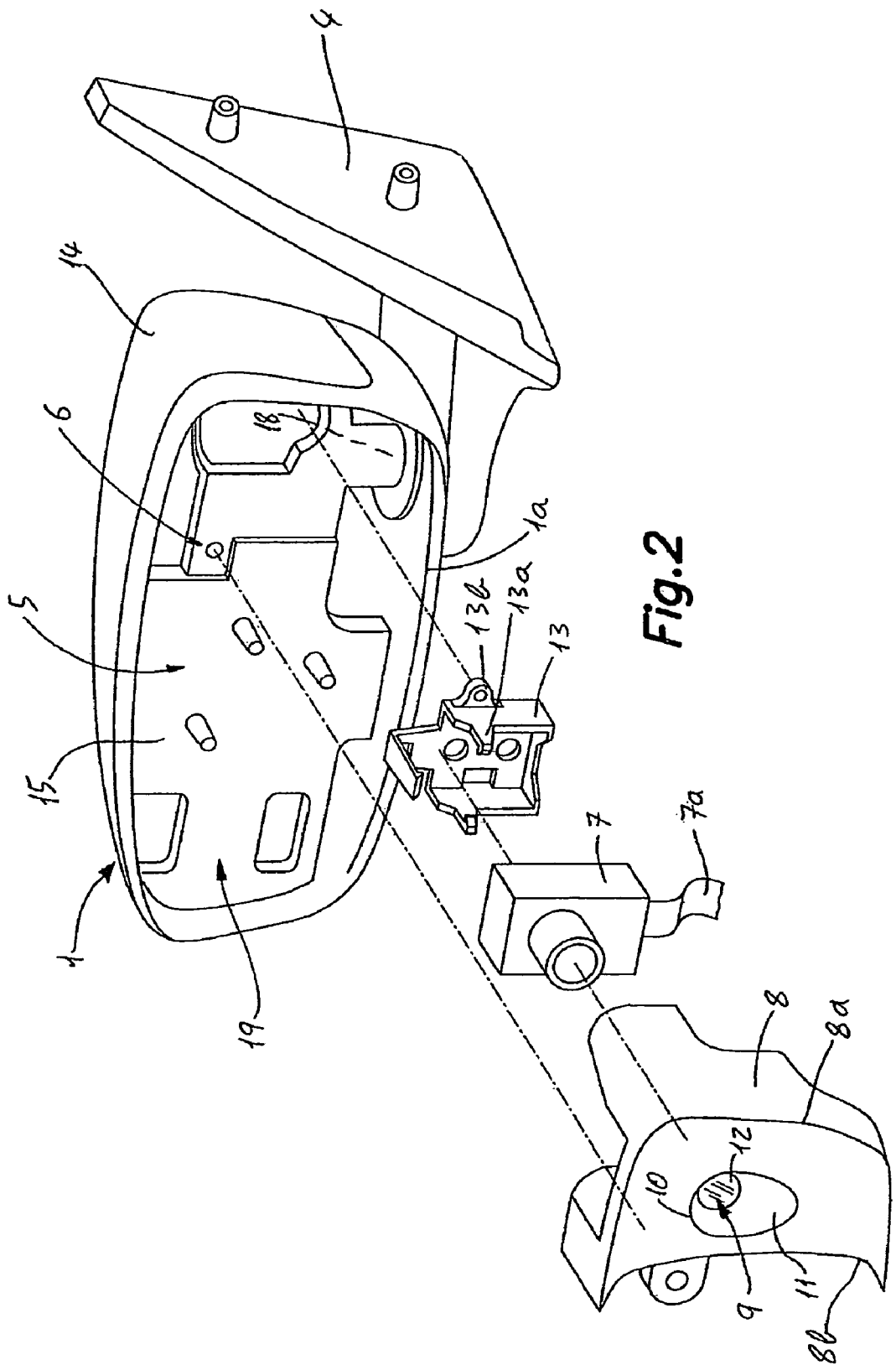
FIG. 2 is an explosive perspective view of a second exemplary embodiment of the assembly.
Figure 3:
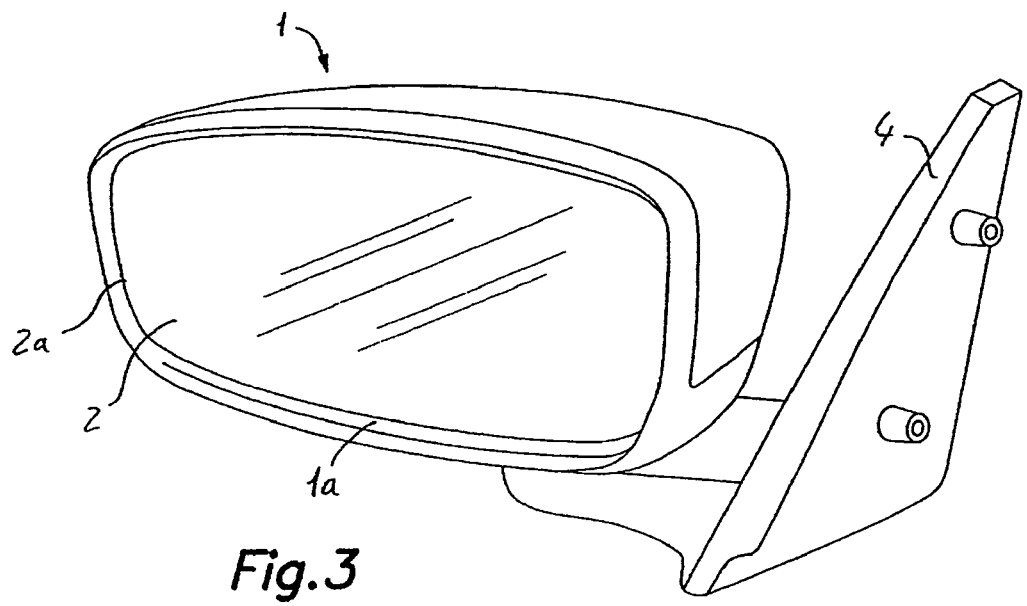
FIG. 3 is a perspective view of the assembly of the present invention once mounted, with a reflector comprising the whole of the casing opening.
Figure 4:
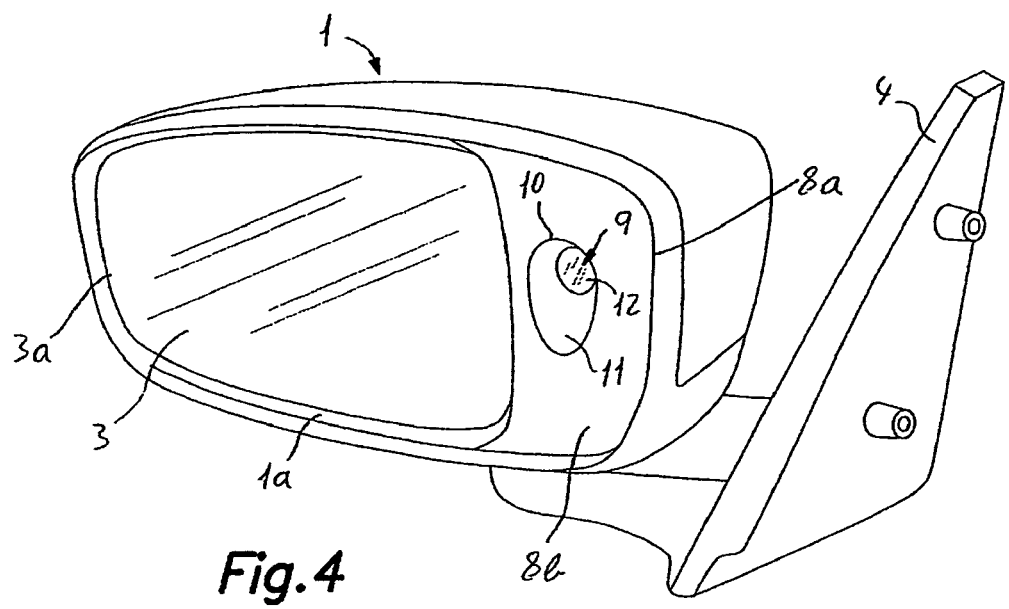
FIG. 4 is a perspective view of the assembly of the present invention once mounted, with a reflector comprising only partially the casing opening, the remaining opening being covered by an adapter.

Said reflector and detector fastening means 5, 6 are configured and arranged in such a way (see FIGS. 1 and 2) that when said first reflector 2 is mounted to the reflector fastening means 5, the first reflector 2 is overlapping the detector fastening means 6, as seen in FIG. 3, where it is also shown the first reflector provided with an outer contour 2a that conforms to said inner contour 1a of the mentioned cavity opening 19 with a clearance, and when said second reflector 3 is mounted to the reflector fastening means 5, the detector fastening means 6 are available for the installation of said image detector device 7 in operating conditions, as shown in FIG. 4. The image detector device 7 will be mounted through an adapter 8 to which has been previously coupled, the adapter 8 being configured to be fixed in the detector fastening means 6 and comprising an orifice 9 through which the image detector device 7 acquires the mentioned images from the exterior. Said adapter 8 is complementary to the second reflector 3, and has an first outer contour portion 8a which conforms to a portion of the inner contour 1a of the cavity opening 19 of casing 1 and an second outer contour portion 8b cooperating with the remaining portion of the inner contour 1a of the cavity 19, in order to define a new inner contour, of smaller size, to which an outer contour 3a of the second reflector 3 conforms with a clearance.

The reflector fastening means 5 are integrated in an actuating device located in cavity 19 to selectively move the reflector 2, 3 in relation to casing 1, this actuating device eventually including at least one electric motor.

It is to underline that adapter 8 and the image detector device 7 comprise attaching and centring means cooperating together to maintain the image detector device 7 in an appropriate position facing said orifice 9.

In the exemplary embodiment shown in FIG. 2 said attaching and centring means include an auxiliary chassis 13 provided with configurations 13a to fasten the image detector device 7 and other configurations 13b adapted for the fixation of the auxiliary chassis 13 to the adapter 8 or to a back wall 15 of the cavity 19 by the detector fastening means 6. Said configurations could consist of elastic fingers with flanges at its ends or holes to fit in corresponding stubs located in adapter 8 or being part of the detector fastening means 6, although other forms which would occur to any skilled in the art are possible.

Figure 5:
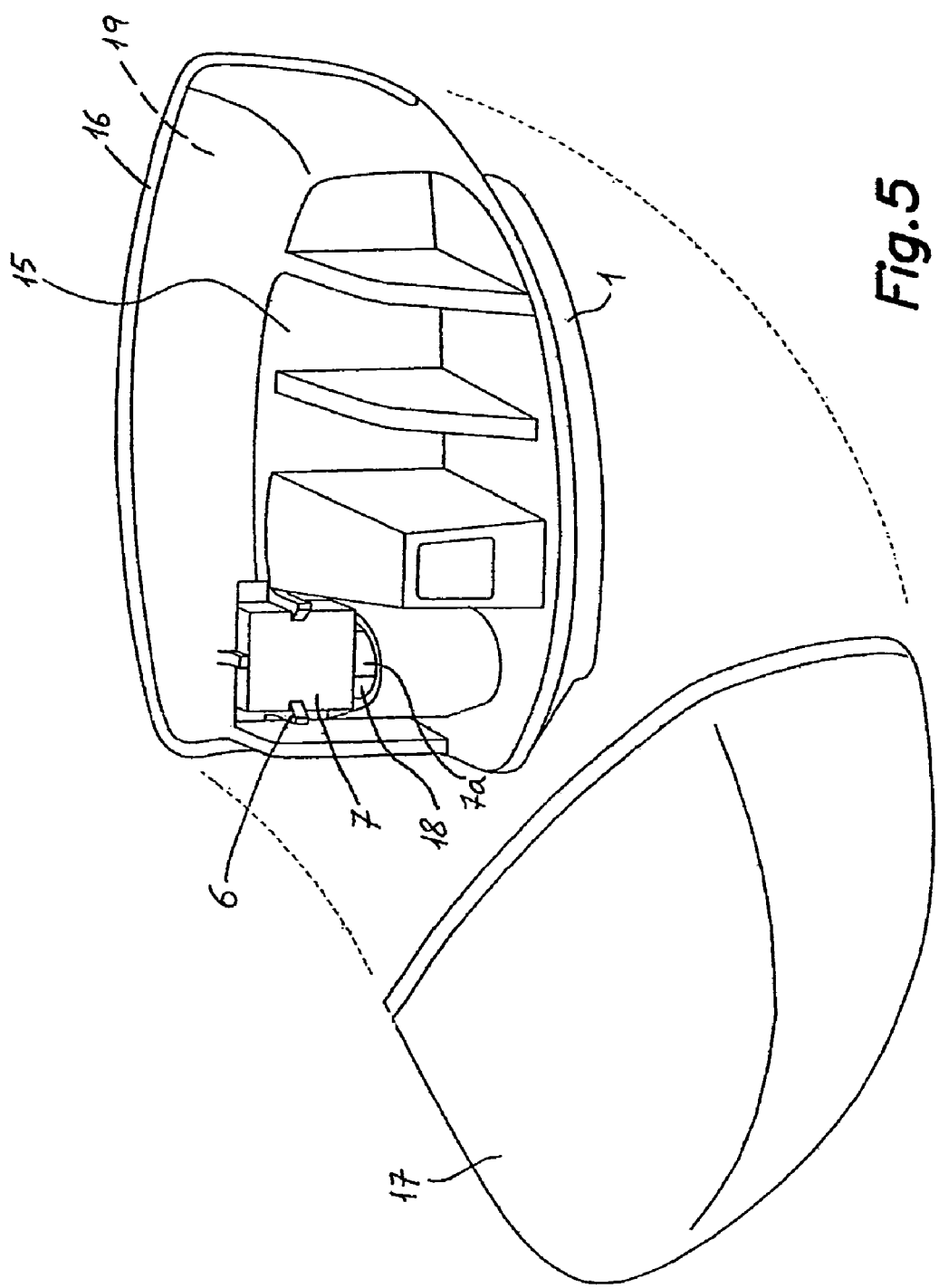
FIG. 5 is a perspective rear-view of another exemplary embodiment of the assembly, where the image detector device is shown directly coupled to a rear part of the reflector.

The previously explained configurations could also be used, in other exemplary embodiments without the auxiliary chassis 13, as those shown in FIG. 5, where the image detector device 7 is seen directly coupled to the rear part of the reflector by means of elastic fingers with flanges at its ends. If the image detector device 7 is directly coupled to the adapter 8, this coupling could obviously also be performed by equal or similar configurations as the ones already described.

In another exemplary embodiment (not shown) a structure as the one reflected in the exemplary embodiment shown in FIG. 5 could be arranged, but including an auxiliary chassis similar to the one proposed in the exemplary embodiment shown in FIG. 2 provided with configurations to fix the image detector device 7 and other configurations adapted to fix the auxiliary chassis to the inner back wall 15, acting as said attaching and centring means, all the previously mentioned options being contemplated for said configurations.

Figure 7:
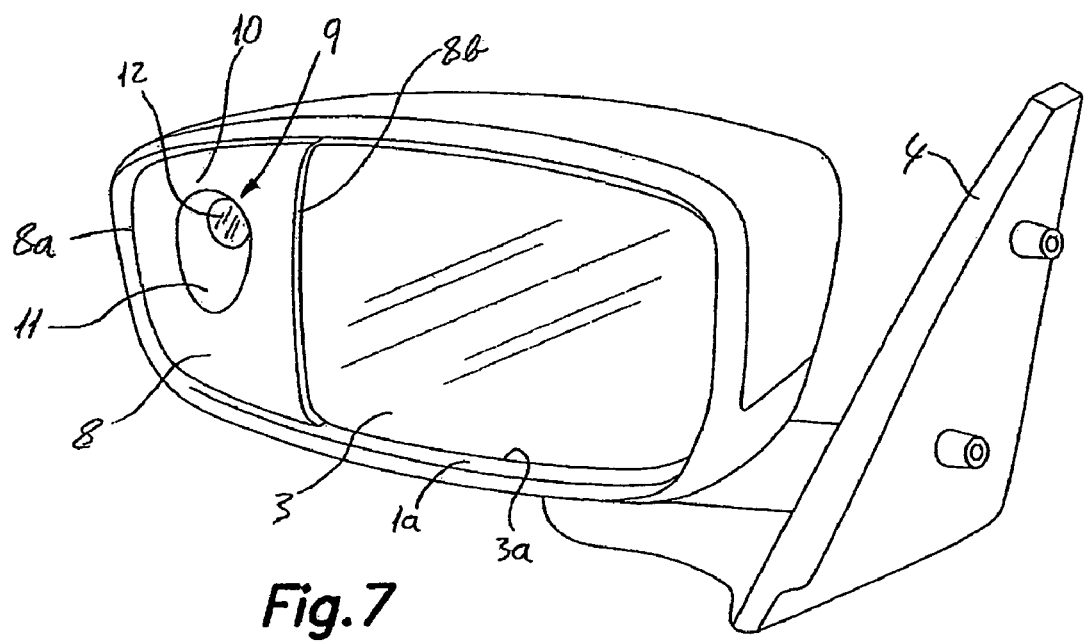
FIG. 7 is a view of the assembly once mounted according to an exemplary embodiment different to the one shown in FIG. 4.

Having a closer look to FIGS. 1, 4, 7, 8 and 9 it is to be observed how the adapter 8 configuration may have different forms and sizes, especially in the FIGS. 1, 4 and 7, wherein said second outer contour portion 8b of adapter 8 is concave, in FIG. 8, wherein the second outer contour portion 8b is substantially straight, and in FIG. 9, wherein the second outer contour portion 8b is convex.

In the exemplary embodiment shown in FIG. 8 another interesting alternative is shown, as is the inclusion of an auxiliary reflector 20, which could be used to encompass a different field of view than the one covered by reflector 3, increasing in this way the information coming from the exterior to which the vehicle's driver has access, thereby making driving easier and safer.

In the previous figures it is clearly seen how neither the adapter 8 nor the image detector device 7 protrude from an outer edge of the cavity opening 19 of casing 1.

Figure 6:
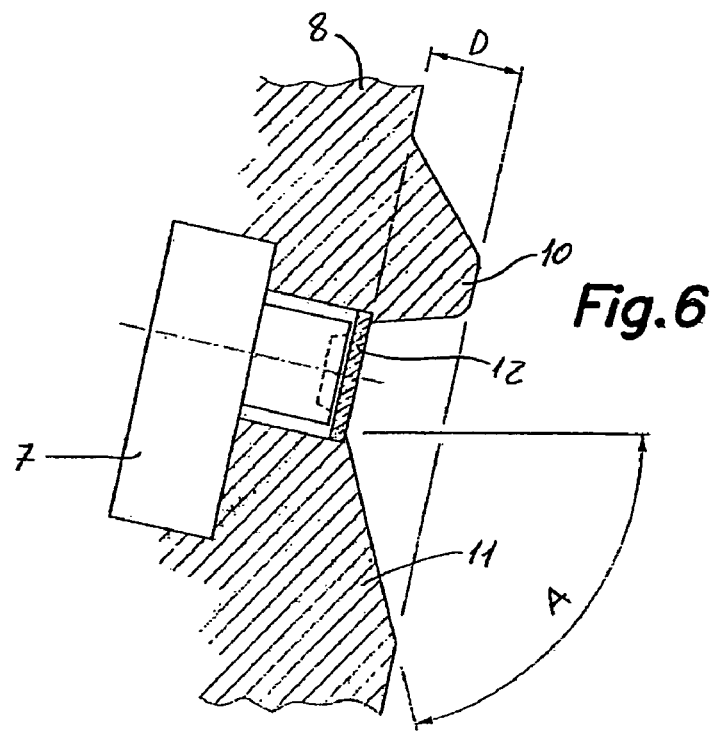
FIG. 6 is a magnified view in cross section of the adapter shown in FIG. 1, with the image detector device coupled to it.

Previously a comment was made about how said adapter 8 is fixed to the image detector device 7, and how said adapter 8 is located in casing 1. No mention was made however regarding adapter 8 features to warrant a good operation of the image detector device 7. Therefore, adapter 8 comprises a visor 10 configuration adjacent to an upper part of said orifice 9 and a gutter 11 configuration adjacent to a lower part of the orifice 9, the gutter 11 configuration having a lower portion inclined at an angle A of at least 45° to the horizontal, collaborating both visor 10 and gutter 11 configurations to protect the image detector device 7 against environmental agents. Said visor configuration 10 and/or said gutter configuration 11 protrude from the orifice 9 a distance D equal to or greater than the diameter of orifice 9. All this is clearly reflected in FIG. 6, where it is also seen the section of a transparent element 12, such as a lens, which closes the orifice 9 of the adapter 8, offering this way a major protection to the image detector device 7 in front of environmental agents or any other type of external aggression, as for example hits, dust, water, etc.

In FIGS. 1, 2 and 5 it is seen how casing 1 comprises an inner back wall 15 defining the cavity 19 and a frame 16 comprising a wide opening limited by the inner contour 1a. Said back wall 15 has at least one opening 18, visible in FIG. 5, to facilitate the pass of at least one connection wiring 7a of the image detector device 7, said wiring accessing to the interior of the vehicle through a passageway through an articulation which enables the rotation of the assembly to said support base 4.

In the exemplary embodiment shown in FIGS. 1 and 2, said frame 16 is integral with a convex shell 14 which completes casing 1 and said inner back wall 15 is a piece coupled to the interior of said convex shell 14 through the wide opening limited by the mentioned inner contour 1a.

In another exemplary embodiment shown in FIG. 5, the rear-view mirror assembly of the present invention comprises a removable convex cover 17 coupled to at least a part of frame 16 at an opposite side to cavity 19, covering the inner back wall 15 at its outer part and completing the casing 1. In said exemplary embodiment the image detector device 7 is mounted on the rear part of the inner back wall 15, therefore the inner back wall 15 comprises at least one opening for the image detector device 7 in relation to the detector fastening means 6, which include attaching and centring means, in order to maintain the image detector device 7 in an appropriate position facing said orifice 9 of adapter 8, as it is already explained above.

One skilled in the art could introduce changes and modifications to the described exemplary embodiments without departing from the scope of the invention as defined in the attached claims.

The invention claimed is:

1. A vehicle exterior rear view mirror assembly prepared to carry an image detector device comprising:
   a casing in which at least one reflector is installed providing a reflected rear image visible by a vehicle occupant, said casing adaptable between a first configuration and a second configuration;
   a support base to fix said casing with said reflector to a part of the vehicle;
   detector fastening means to support on said casing said image detector device, which is adapted to provide a signal representative of a rear image susceptible to be processed and presented as an information to a vehicle occupant; and
   reflector fastening means to support on said casing either
   i) in said first configuration, a first reflector of a first size facing rearward with respect to said casing, said reflector and detector fastening means configured and disposed such that when said first reflector is mounted on the reflector fastening means the first reflector overlaps the detector fastening means hiding the reflector fastening means and the detector fastening means, or
   ii) in said second configuration a second reflector of a second size facing rearward with respect to said casing, said second size being smaller than said first size, said second reflector mounted on the reflector fastening means, the detector fastening means available for the installation of said image detector device alongside said second reflector facing rearward with respect to said casing.

2. The rear view mirror assembly according to claim 1, wherein the casing defines at least one cavity accessible through a wide opening limited by an inner contour, the reflector and detector fastening means being located in said at least one cavity.

3. The rear view mirror assembly according to claim 2, wherein the first reflector is provided with an external contour which substantially conforms to said inner contour of said opening of the cavity with a clearance.

4. The rear view mirror assembly according to claim 2, further comprising an adapter provided with an orifice through which the image detector device acquires information, said adapter being complementary to the second reflector and having a first outer contour portion conformed to a portion of the inner contour of the cavity opening of the casing and a second outer contour portion cooperating with the remaining portion of the inner contour of the cavity in order to define a new inner contour, of smaller size, to which an outer contour of the second reflector conforms with a clearance.

5. The rear view mirror assembly according to claim 4, wherein the image detector device is mounted to said adapter, which is configured to be fixed in the detector fastening means.

6. The rear view mirror assembly according to claim 5, wherein the adapter and the image detector device comprise fastening and centering means which cooperate with each other to maintain the image detector device in an appropriate position facing said orifice.

7. The rear view mirror assembly according to claim 6, wherein said fastening and centering means include an auxiliary chassis provided with first configurations to fasten the image detector device and second configurations adapted to fix the auxiliary chassis to the adapter or to a back wall of the cavity by means of the detector fastening means.

8. The rear view mirror assembly according to claim 4, wherein the adapter and the image detector device do not protrude from an outer edge of the cavity opening of the casing.

9. The rear view mirror assembly according to claim 4, wherein said second outer contour portion of the adapter is concave.

10. The rear view mirror assembly according to claim 4, wherein said second outer contour portion of the adapter is convex.

11. The rear view mirror assembly according to claim 4, wherein said second outer contour portion of the adapter is substantially straight.

12. The rear view mirror assembly according to claim 4, wherein the adapter comprises a visor configuration adjacent to an upper part of said orifice for protection against environmental agents.

13. The rear view mirror assembly according to claim 12, wherein the adapter comprises a gutter configuration adjacent to a lower part of said orifice for protection against environmental agents.

14. The rear view mirror assembly according to claim 13, wherein said gutter configuration has a lower portion inclined at an angle of at least 45° from the horizontal.

15. The rear view mirror assembly according to claim 13, wherein said visor configuration and/or said gutter configuration protrude with respect to the orifice a distance equal to or greater than the orifice diameter.

16. The rear view mirror assembly according to claim 4, wherein the orifice of the adapter is closed by a transparent element.

17. The rear view mirror assembly according to claim 4, wherein the adapter further comprises an auxiliary reflector providing a rearward image associated with said vehicle.

18. The rear view mirror assembly according to claim 2, wherein the reflector fastening means are integrated in an actuator device located in the cavity, in order to selectively move the reflector in relation to the casing.

19. The rear view mirror assembly according to claim 18, wherein said actuator device includes at least one electric motor.

20. The rear view mirror assembly according to claim 4, wherein the casing comprises an inner back wall defining said cavity and a frame that defines said wide opening limited by said inner contour.

21. The rear view mirror assembly according to claim 20, wherein said inner back wall is provided with at least one opening to facilitate access to at least one connection wiring of the image detector device.

22. The rear view mirror assembly according to claim 20, wherein said frame is integral with a convex shell that completes the casing and said inner back wall is a piece coupled to the interior of said convex shell through the wide opening limited by said inner contour.

23. The rear view mirror assembly according to claim 20, wherein a removable convex cover is coupled to at least a part of said frame at an opposite side of the cavity, said removable convex cover covering said inner back wall at its exterior part and completing the casing.

24. The rear view mirror assembly according to claim 23, wherein the image detector device is mounted on the rear part of said inner back wall, the inner back wall comprising at least one opening for the image detector device in relationship with the detector fastening means, which include fastening and centering means to maintain the image detector device in an appropriate position facing said orifice of the adapter.

25. The rear view mirror assembly according to claim 24, wherein an auxiliary chassis is provided with first attaching means to fasten the image detector device to said auxiliary chassis and second attaching means adapted to fix said auxiliary chassis to the inner back wall, said first and second attaching means acting as said fastening and centering means.

26. The rear view mirror assembly according to claim 5, wherein the orifice of the adapter is closed by a transparent element.

27. The rear view mirror assembly according to claim 6, wherein the orifice of the adapter is closed by a transparent element.

28. The rear view mirror assembly according to claim 7, wherein the orifice of the adapter is closed by a transparent element.

29. The rear view mirror assembly according to claim 8, wherein the orifice of the adapter is closed by a transparent element.

30. The rear view mirror assembly according to claim 9, wherein the orifice of the adapter is closed by a transparent element.

31. The rear view mirror assembly according to claim 10, wherein the orifice of the adapter is closed by a transparent element.

32. The rear view mirror assembly according to claim 11, wherein the orifice of the adapter is closed by a transparent element.

33. The rear view mirror assembly according to claim 12, wherein the orifice of the adapter is closed by a transparent element.

34. The rear view mirror assembly according to claim 13, wherein the orifice of the adapter is closed by a transparent element.

35. The rear view mirror assembly according to claim 14, wherein the orifice of the adapter is closed by a transparent element.

36. The rear view mirror assembly according to claim 15, wherein the orifice of the adapter is closed by a transparent element.

* * * * *